US011546587B2

(12) United States Patent
Hsiao et al.

(10) Patent No.: US 11,546,587 B2
(45) Date of Patent: Jan. 3, 2023

(54) ADAPTIVE LOOP FILTER WITH ADAPTIVE PARAMETER SET

(71) Applicant: MediaTek Inc., Hsinchu (TW)

(72) Inventors: Yu-Ling Hsiao, Hsinchu (TW);
Chun-Chia Chen, Hsinchu (TW);
Ching-Yeh Chen, Hsinchu (TW);
Tzu-Der Chuang, Hsinchu (TW);
Chih-Wei Hsu, Hsinchu (TW)

(73) Assignee: MediaTek Inc.

( * ) Notice: Subject to any disclaimer, the term of this patent is extended or adjusted under 35 U.S.C. 154(b) by 180 days.

(21) Appl. No.: 16/845,070

(22) Filed: Apr. 10, 2020

(65) Prior Publication Data
US 2020/0329239 A1 Oct. 15, 2020

Related U.S. Application Data

(60) Provisional application No. 62/832,349, filed on Apr. 11, 2019, provisional application No. 62/880,690, filed on Jul. 31, 2019.

(51) Int. Cl.
*H04N 19/117* (2014.01)
*H04N 19/176* (2014.01)
*H04N 19/82* (2014.01)

(52) U.S. Cl.
CPC ......... *H04N 19/117* (2014.11); *H04N 19/176* (2014.11); *H04N 19/82* (2014.11)

(58) Field of Classification Search
None
See application file for complete search history.

(56) References Cited

U.S. PATENT DOCUMENTS 9,807,395 B2  10/2017  Kerofsky et al.
2013/0022104 A1  1/2013  Chen et al.
(Continued)

FOREIGN PATENT DOCUMENTS

RU  2647704 C1  3/2018
RU  2665308 C2  8/2018
(Continued)

OTHER PUBLICATIONS

Hu et al., "CE5: Coding tree block based adaptive loop filter (CE5-4)", Joint Video Experts Team (JVET)of ITU-T SG 16 WP 3 and ISO/IEC JTC 1/SC 29/WG 11, 14th Meeting: Geneva, CH, Mar. 19-27, 2019. (Year: 2019).*
(Continued)

*Primary Examiner* — Kaitlin A Retallick
(74) *Attorney, Agent, or Firm* — Han IP PLLC; Andy M. Han

(57) ABSTRACT

A method for signaling adaptive loop filter (ALF) settings is provided. A video decoder receives data from a bitstream for a block of pixels to be decoded as a current block of a current picture of a video. The video decoder parses whether to use adaptive parameter set (APS) for filtering the current block without determining whether to select a particular APS from a plurality of APSs. When the APS is used to filter the current block, the video decoder parses a first filter selection index for selecting a filter from a set of filters in the APS. When the APS is not used to filter the current block, the video decoder signals a second filter selection index for selecting a filter from a set of default fixed filters. The video decoder filters the current block based on the selected filter. The video decoder outputs the filtered current block.

11 Claims, 11 Drawing Sheets

(56) References Cited

U.S. PATENT DOCUMENTS

| | | |
|---|---|---|
| 2013/0215974 A1 | 8/2013 | Chong et al. |
| 2018/0184128 A1 | 6/2018 | Chen et al. |
| 2018/0270479 A1 | 9/2018 | Chen et al. |
| 2020/0029080 A1 | 1/2020 | Kim et al. |
| 2020/0314424 A1* | 10/2020 | Hu .................. H04N 19/117 |

FOREIGN PATENT DOCUMENTS

| | | |
|---|---|---|
| WO | WO 2012094751 A1 | 7/2012 |
| WO | WO 2017201011 A1 | 11/2017 |
| WO | WO 2018174593 A1 | 9/2018 |
| WO | WO 2019010267 A1 | 1/2019 |

OTHER PUBLICATIONS

Taiwan Intellectual Property Office, Office Action for Taiwan Patent Application No. 109112212, dated May 17, 2021.

USPTO, Office Action for U.S. Appl. No. 17/424,656, dated Feb. 3, 2022.

Jonathan Taquet et al., "Non-Linear Adaptive Loop Filter", Joint Video Experts Team (JVET) of ITU-T SG 16 WP 3 and ISO/IEC JTC 1/SC 29/WG 11, Document: JVET-M0385, 13th Meeting, Marrakech, MA, Jan. 9-18, 2019.

Russian Patent Office, Notice of Office Action and Search Report regarding Russian Patent Application No. 2021122300, dated Apr. 28, 2022.

* cited by examiner

ADAPTIVE LOOP FILTER WITH ADAPTIVE PARAMETER SET

CROSS REFERENCE TO RELATED PATENT APPLICATION(S)

The present disclosure is part of a non-provisional application that claims the priority benefit of U.S. Provisional Patent Applications Nos. 62/832,349 and 62/880,690, filed on 11 Apr. 2019 and 31 Jul. 2019, respectively. Contents of above-listed applications are herein incorporated by reference in their entirety.

TECHNICAL FIELD

The present disclosure relates generally to video processing. In particular, the present disclosure relates to methods of signaling adaptive loop filter settings.

BACKGROUND

Unless otherwise indicated herein, approaches described in this section are not prior art to the claims listed below and are not admitted as prior art by inclusion in this section.

High-efficiency video coding (HEVC) is the latest international video coding standard developed by the Joint Collaborative Team on Video Coding (JCT-VC). The input video signal is predicted from the reconstructed signal, which is derived from the coded picture regions. The prediction residual signal is processed by a linear transform to produce a set of transform coefficients. The transform coefficients are quantized, and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In HEVC, a coded picture is partitioned into non-overlapped square block regions represented by the associated coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. A predictive (P) slice is decoded using intra prediction or inter prediction using at most one motion vector and reference index to predict the sample values of each block. An intra (I) slice is decoded using intra prediction only.

A CTU can be partitioned into multiple non-overlapped coding units (CUs) using the recursive quadtree (QT) structure to adapt to various local motion and texture characteristics. A CTU may also be partitioned into one or multiple smaller size CUs by a quadtree with nested multi-type tree using binary and ternary split. The resulting CU partitions can be in square or rectangular shapes.

One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with other side information are entropy coded in the bitstream.

The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for signaling adaptive loop filter (ALF) settings. A video decoder receives data from a bitstream for a block of pixels to be decoded as a current block of a current picture of a video. The video decoder parses whether to use adaptive parameter set (APS) for filtering the current block without determining whether to select a particular APS from a plurality of APSs. When the APS is used to filter the current block, the video decoder parses a first filter selection index for selecting a filter from a set of filters in the APS. When the APS is not used to filter the current block, the video decoder parses a second filter selection index for selecting a filter from a set of default fixed filters. The video decoder filters the current block based on the selected filter. The video decoder outputs the filtered current block.

In some embodiments, the video decoder receives data from a bitstream for a block of pixels to be decoded as a current block of a current picture of a video. The video decoder selects an APS from a plurality of APSs by using an APS identifier signaled in a slice header, wherein the selected APS is for providing a filter for chroma pixels of the current block. The video decoder selects a filter from a set of filters in the APS. The video decoder filters the current block based on the selected filter and outputs the filtered current block.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

Figures 2A, 2B, 2C, 2D:
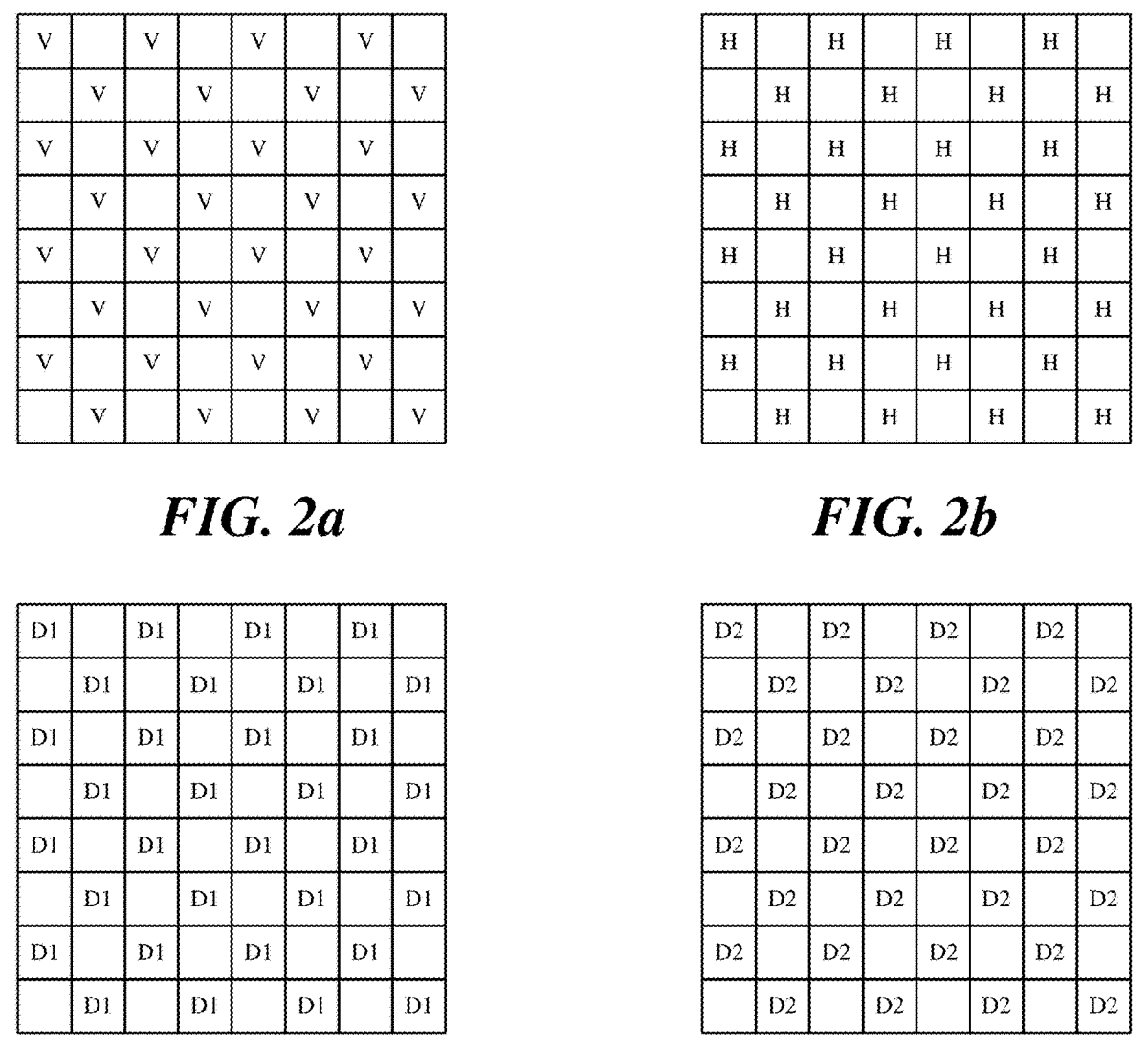

FIGS. 2a-d show sub-sampled Laplacian calculation.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Figure 1A:
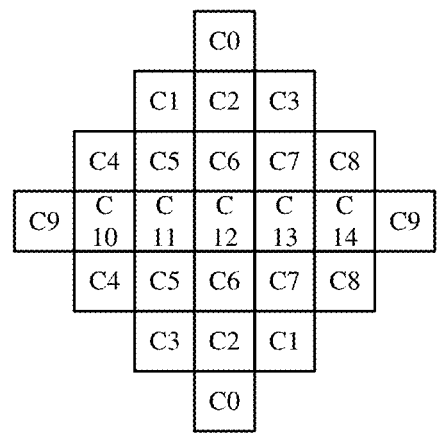
FIGS. 1a-b illustrate two diamond filter shapes for luma and chroma component.
Figure 1B:
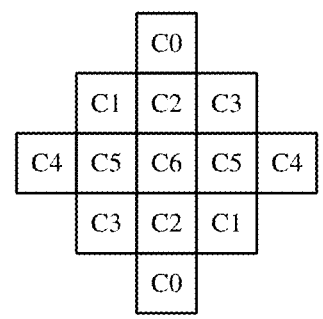

Adaptive Loop Filter (ALF) is a loop filter to filter the video pixels by some customized filter coefficients. The filter coefficients can have default in video codec or be signaled from encoder to decoder in a block level (e.g., CTU or CTB). ALF is a well-known technique in HEVC. In some embodiments, an ALF with block-based filter adaption is applied. For the luma component, one filter among 25 filters is selected for each 4×4 block, based on the direction and activity of local gradients. FIGS. 1a-b illustrate two diamond filter shapes for luma and chroma component. FIG. 1a illustrates a 7×7 diamond shape that is applied to luma component. FIG. 1b illustrates a 5×5 diamond shape that is applied to chroma components.

For luma component, each 4×4 block is categorized into one of 25 classes. The classification index C is derived based on its directionality D and a quantized value of activity Â, as follows:

$$C = 5D + \hat{A}$$

To calculate D and Â, gradients of the horizontal, vertical and two diagonal direction are first calculated using 1-D Laplacian:

$$g_v = \sum_{k=i-2}^{i+3} \sum_{l=j-2}^{j+3} V_{k,l}, \quad V_{k,l} = |2R(k,l) - R(k,l-1) - R(k,l+1)|$$

$$g_h = \sum_{k=i-2}^{i+3} \sum_{l=j-2}^{j+3} H_{k,l}, \quad H_{k,l} = |2R(k,l) - R(k-1,l) - R(k+1,l)|$$

$$g_{d1} = \sum_{k=i-2}^{i+3} \sum_{l=j-3}^{j+3} D1_{k,l}, \quad D1_{k,l} = |2R(k,l) - R(k-1,l-1) - R(k+1,l+1)|$$

$$g_{d2} = \sum_{k=i-2}^{i+3} \sum_{j=j-2}^{j+3} D2_{k,l},$$

$$D2_{k,l} = |2R(k,l) - R(k-1,l+1) - R(k+1,l-1)|$$

Where indices i and j refer to the coordinates of the upper left sample within the 4×4 block and R(i,j) indicates a reconstructed sample at coordinate (i,j). To reduce the complexity of block classification, the subsampled 1-D Laplacian calculation is applied. FIGS. 2a-d show sub-sampled Laplacian calculation. FIG. 2a shows subsampled positions for vertical gradient. FIG. 2b shows subsampled positions for horizontal gradient. Both FIGS. 2c and 2d show subsampled positions for diagonal gradient. As illustrated in FIGS. 2a-d, the same subsampled positions are used for gradient calculation of all directions.

Then D maximum and minimum values of the gradients of horizontal and vertical directions are set as:

$$g_{h,v}^{max} = \max(g_h, g_v), g_{h,v}^{min} = \min(g_h, g_v)$$

The maximum and minimum values of the gradient of two diagonal directions are set as:

$$g_{d0,d1}^{max} = \max(g_{d0}, g_{d1}), g_{d0,d1}^{min} = \min(g_{d0}, g_{d1})$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \sum_{k=i-2}^{i+3} \sum_{l=j-2}^{j+3} (V_{k,l} + H_{k,l})$$

A is further quantized to the range of 0 to 4, inclusively, and the quantized value is denoted as Â. For chroma components in a picture, no classification method is applied, i.e., a single set of ALF coefficients is applied for each chroma component.

In some embodiments, before filtering each 4×4 luma block, geometric transformations such as rotation or diagonal and vertical flipping are applied to the filter coefficients f(k,l) and to the corresponding filter clipping values c(k,l) depending on gradient values calculated for that block. This is equivalent to applying these transformations to the samples in the filter support region. This makes different blocks to which ALF is applied more similar by aligning their directionality. Three geometric transformations, including diagonal, vertical flip and rotation are as followed:

Diagonal: $f_D(k,l) = f(l,k), c_D(k,l) = c(l,k)$,
Vertical flip: $f_V(k,l) = f(k, K-l-1), c_V(k,l) = c(k, K-l-1)$
Rotation: $f_R(k,l) = f(K-l-1, k), c_R(k,l) = c(K-l-1, k)$ where K is the size of the filter and $0 \leq k$, $l \leq K-1$ are coefficients coordinates, such that location (0,0) is at the upper-left corner and location (K−1, K−1) is at the lower-right corner. The transformations are applied to the filter coefficients f(k,l) and to the clipping values c(k,l) depending on gradient values calculated for that block. The relationship between the transformation and the four gradients of the four directions are summarized in Table 1 below.

TABLE 1

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

In some embodiments, ALF filter parameters (including ALF coefficients and clipping values) are signaled in an Adaptation Parameter Set (APS). In one APS, up to 25 sets of luma filter coefficients and clipping value indices, and up to one set of chroma filter coefficients and clipping value indices may be signaled. To reduce bits overhead, filter coefficients of different classification can be merged. In some embodiments, the indices of the APSs used for the current slice are signaled in slice header.

Clipping value indices, which are decoded from the APS, allow determining clipping values using a Luma table of clipping values and a Chroma table of clipping values. These clipping values are dependent of the internal bit depth. More precisely, the Luma table of clipping values and Chroma table of clipping values are obtained by the following formulas:

$$AlfClip_L = \left\{ \text{round}\left(2^{B\frac{N-n+1}{N}}\right) \text{ for } n \in [1 \dots N] \right\},$$

$$AlfClip_C = \left\{ \text{round}\left(2^{(B-8)+8\frac{(N-n)}{N-1}}\right) \text{ for } n \in [1 \dots N] \right\}$$

with B equal to the internal bit depth and N equal to 4, which is the number of allowed clipping values in some embodiments.

In some embodiments, the filtering process is controlled at CTB level. A flag may be signalled to indicate whether ALF is applied to a luma CTB. A luma CTB may choose a filter set among 16 fixed filter sets and the filter sets from APSs. A filter set index is signaled for a luma CTB to indicate which filter set is applied. The 16 fixed filter sets are pre-defined or hard-coded in both the encoder and the decoder.

In some embodiments, the filter coefficients may be quantized with norm equal to 128. In order to restrict the multiplication complexity, a bitstream conformance is applied so that the coefficient value of the non-central position shall be in the range of $-2^7$ to $2^7-1$, inclusive. The central position coefficient is not signaled in the bitstream and is considered as equal to 128.

In some embodiments, at decoder side, when ALF is enabled for a CTB, each sample R(i,j) within the CU is filtered, resulting in sample value R'(i,j) as shown below, $$R'(i, j) = R(i, j) + \left(\left(\sum_{k \neq 0}\sum_{l \neq 0} f(k, l) \times K(R(i+k, j+l) - R(i, j), c(k, l)) + 64\right) >> 7\right)$$

where f(k,l) denotes the decoded filter coefficients, K(x,y) is the clipping function and c(k,l) denotes the decoded clipping parameters. The variable k and l vary between $$-\frac{L}{2} \text{ and } \frac{L}{2}$$

where L denotes the filter length. The clipping function K(x,y)=min(y, max(−y,x)) which corresponds to the function Clip3 (−y, y, x).

Figure 3:
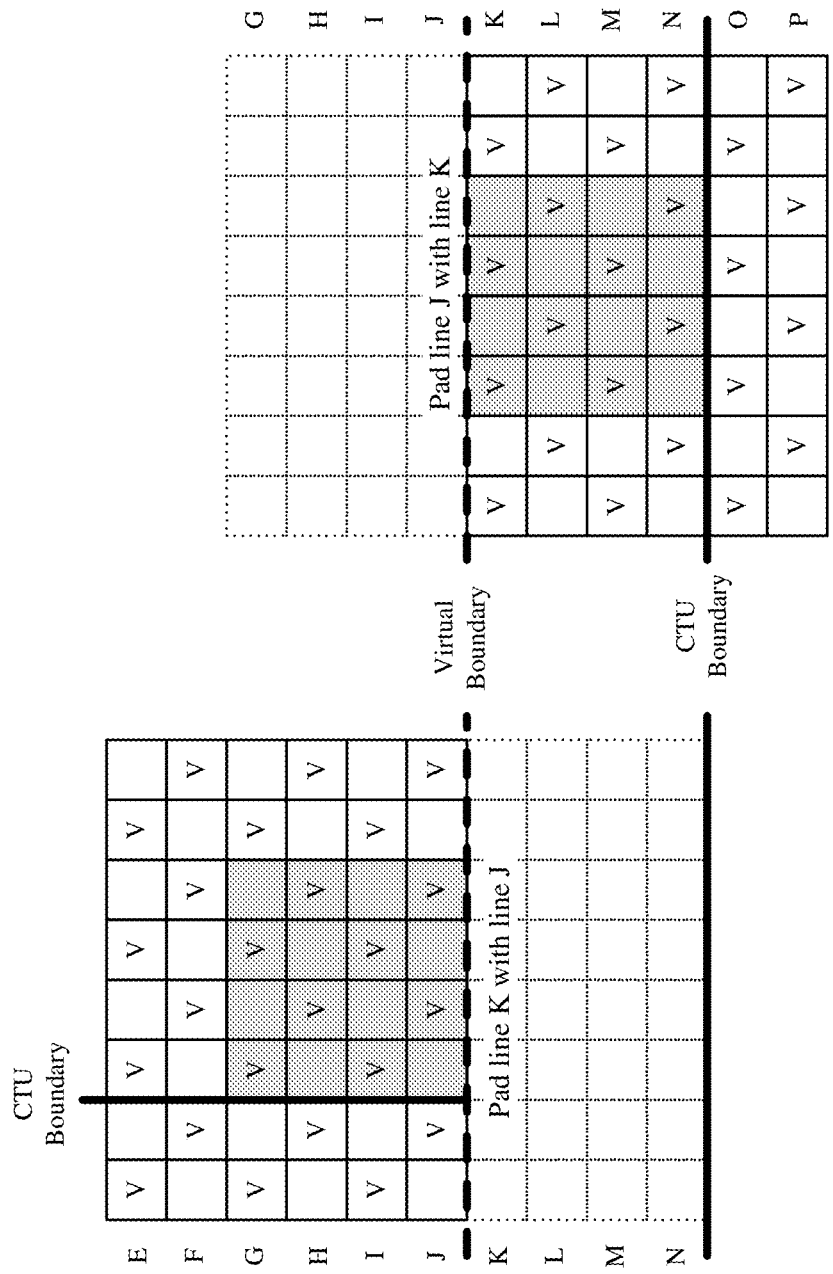
FIG. 3 illustrates modified block classification at virtual boundaries.

In some embodiments, to reduce the line buffer requirement of ALF, modified block classification and filtering are employed for the samples near horizontal CTU boundaries. In some embodiments, a virtual boundary is defined as a line by shifting the horizontal CTU boundary with "N" samples. FIG. 3 illustrates modified block classification at virtual boundaries. In the example, N is equal to 4 for the Luma component and 2 for the Chroma component. Modified block classification is applied for the Luma component. For the 1 D Laplacian gradient calculation of the 4×4 block above the virtual boundary, only the samples above the virtual boundary are used. Similarly, for the 1 D Laplacian gradient calculation of the 4×4 block below the virtual boundary, only the samples below the virtual boundary are used. The quantization of activity value A is accordingly scaled by taking into account the reduced number of samples used in 1 D Laplacian gradient calculation.

Figure 4:
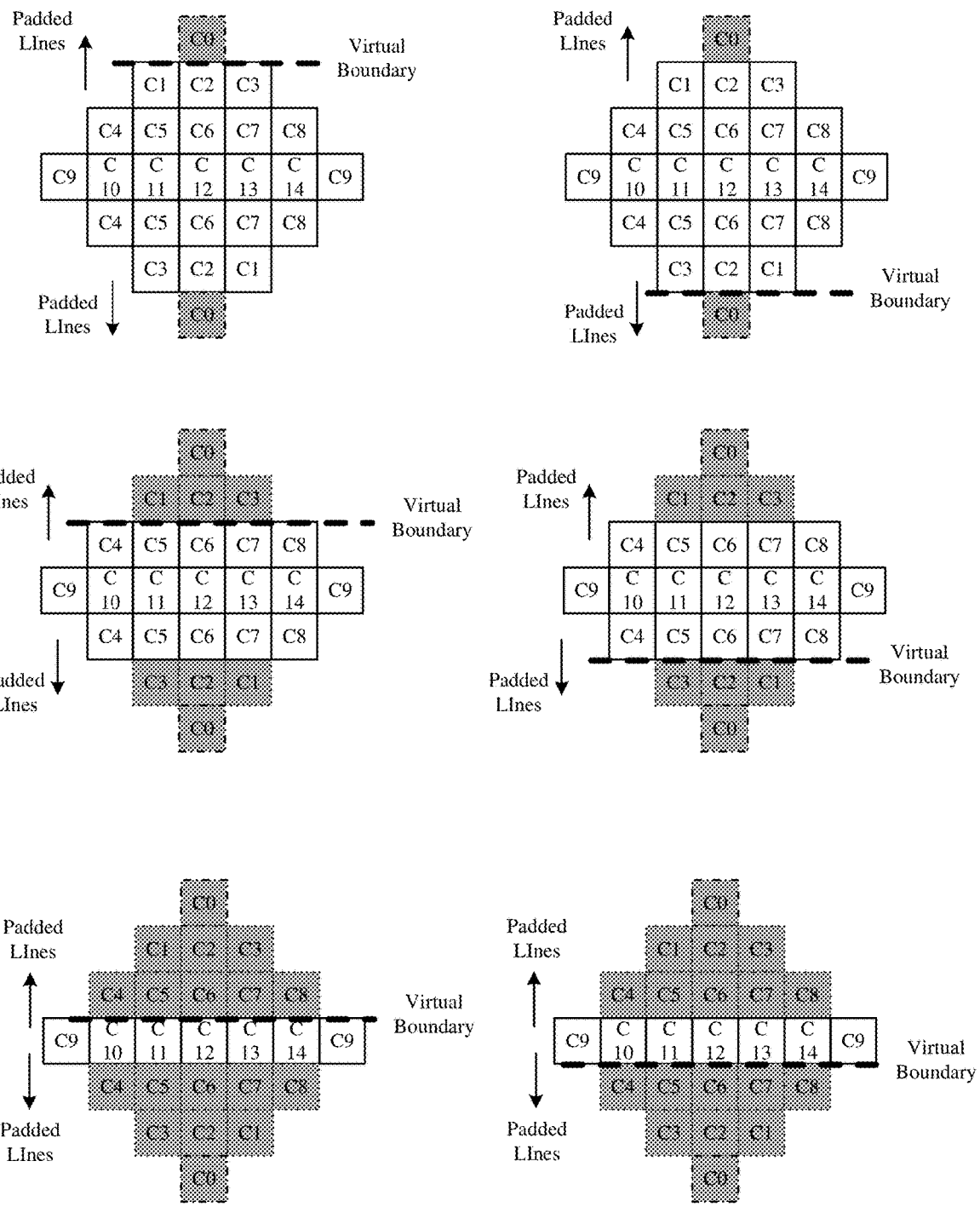
FIG. 4 illustrates modified ALF filtering for luma components at virtual boundaries.

For filtering processing, symmetric padding operation at the virtual boundaries are used for both Luma and Chroma components. FIG. 4 illustrates modified ALF filtering for luma components at virtual boundaries. As illustrated, when the sample being filtered is located below the virtual boundary, the neighboring samples that are located above the virtual boundary are padded. Meanwhile, the corresponding samples at the other sides are also padded, symmetrically.

A CTB is the largest coding tree unit (CTU) for each color component. For some embodiments, at CTB level, the signaling of ALF filter set selection is according to the following:

```
if ( slice__alf__enable__flag ){
    alf__ctb__flag[ 0 ][ xCtb >> Log2CtbSize ][ yCtb >> Log2CtbSize ]
    if (alf__ctb__flag[ 0 ][ xCtb >> Log2CtbSize ][ yCtb >> Log2CtbSize
    ] {
        if ( slice__num__alf__aps__ids__luma > 0)
            alf__ctb__use__first__aps__flag
        if (!alf__ctb__use__first__aps__flag) {
            if ( slice__num__alf__aps__ids__luma > 1)
                alf__use__aps__flag
            if (alf__use__aps__flag)
                alf__luma__pr ev__filter__idx__minus1
            else
                alf__luma__fixed__filter__idx
        }
    }
}
``` alf_ctb_use_first_aps_flag being 1 specifies that the filter information in APS with adaptive_parameter_set_id equal to slice_alf_aps_id_luma[0] is used. Conversely, alf_ctb_use_first_aps_flag being 0 specifies that the luma CTB does not use the filter information in APS with adaptive_parameter_set_id equal to slice_alf_aps_id_luma[0]. When alf_ctb_use_first_aps_flag is not present, it is inferred to be equal to 0. This flag is used to determine whether to select a particular APS from a set of APSs for filtering the current block.

alf_use_aps_flag being 0 specifies that one of the fixed filter sets is applied to the luma CTB; alf_use_aps_flag being 1 specifies that a filter set from an APS is applied to the luma CTB. When alf_use_aps_flag is not present, it is inferred to be equal to 0.

alf_luma_prev_filter_idx_minus1 plus 1 specifies the previous filter that is applied to the luma CTB. The value of alf_luma_prev_filter_idx_minus1 shall be in a range of 0 to slice_num_alf_aps_ids_luma−2, inclusive.

alf_luma_fixed_filter_idx specifies the fixed filter that is applied to the luma CTB. The value of alf_luma_fixed_filter_idx shall be in a range of 0 to 15, inclusive.

In some embodiments, a variable AlfCtbFiltSetIdxY[xCtb>>Log2CtbSize] [yCtb>>Log2CtbSize] specifying the filter set index for the luma CTB at location (xCtb, yCtb) is derived as follows: If alf_ctb_use_first_aps_flag is equal to 1, AlfCtbFiltSetIdxY[xCtb>>Log2CtbSize] [yCtb>>Log2CtbSize] is set equal to 16. Otherwise, if alf_use_aps_flag is equal to 0, AlfCtbFiltSetIdxY[xCtb>>Log2CtbSize] [yCtb>>Log2CtbSize] is set equal to alf_luma_fixed_filter_idx. Otherwise, AlfCtbFiltSetIdxY[xCtb>>Log2CtbSize] [yCtb>>Log2CtbSize] is set equal to 17+alf_luma_prev_filter_idx_minus1.

Some embodiments of the disclosure provide a new CTB signaling for ALF filter selection or ALF filter set selection. For some embodiments, an example syntax table for CTB signaling for ALF filter selection is provided in the following:

```
if (alf_ctb_flag) {
    if (slice_num_alf_aps_ids_luma > 0) {
        use_aps
    }
    if (use_aps) {
        index_of_aps_filters
    }
    else {
        fixed_index
    }
}
```

As illustrated in the syntax table, a "use_aps" flag is signaled first. The "use_aps" means the ALF will use APS filter or filter set instead of fixed default filter or filter set. In some embodiments, the video codec signals the "use_aps" flag without determining whether to select a particular APS from a set of multiple APSs for filtering the current block (e.g., without signaling the alf_ctb_use_first_aps_flag).

If the "use_aps" flag is 0, the fixed filter or filter set selection is signaled. The value "fixed_index" is signaled to specify the fixed filter or filter set that is applied to the luma CTB. If the "use_aps" flag is 1, the aps filter or filter set selection is signaled. In one embodiment, the value "index_of_aps_filters" is signaled to choose one filter or filter set among all APS filters or filter sets. In some embodiments, the "use_aps" flag is inferred to be 0 if slice_num_alf_aps_ids_luma is 0 (so "fixed_index" is signaled to specify the fixed filter set).

In some embodiments, the flag indicating whether to use APS for filtering the current block (e.g., use_aps) is inferred (or implicitly signaled) to be true or false based on chroma format, chroma indicator, or slice type, rather than explicitly signaled.

In some embodiments, each APS contains one set of signalled ALF filters, up to 32 APSs are supported. A tile group may re-use the ALF information from an APS to reduce the overhead. The APSs are updated as a first-in-first-out (FIFO) buffer. In CTB-based ALF, for luma component, when ALF is applied to a luma CTB, the choice among 5 temporal or 1 signaled filter sets is indicated. Only the filter set index is signalled. A corresponding syntax table for ALF data is provided according to the following:

| | Descriptor |
|---|---|
| alf_data( ) { | |
|   alf_chroma_idc | tu(v) |
|   alf_signal_new_filter_luma | u(1) |
|   if( alf_signal_new_filter_luma > 0 ) { | |
|     alf_luma_use_fixed_filter_flag | u(1) |
|     if(alf_luma_use_fixed_filter_flag){ | |
|       alf_luma_fixed_filter_set_index | tb(v) |
|       alf_luma_fixed_filter_usage_pattern | u(1) |
|       if (alf_luma_fixed_filter_usage_pattern > 0) | |
|         for (i = 0; i < NumAlfFilters; i++) | |
|           alf_luma_fixed_filter_usage[i] | u(1) |
|   alf_num_available_temporal_filter_sets_luma | tb(1) |
|   alf_luma_num_filters_signalled_minus1 | tb(v) |
|   ... | |
|   } | |
|   if ( alf_chroma_idc > 0 ) { | |
|     alf_signal_new_filter_chroma | u(1) |
|     if (alf_signal_new_filter_chroma) { | |
|       alf_chroma_min_eg_or_der_minus1 | tu(v) |
|       ... | |
|     } | |
|   } | |
| } | |

For one slice, only one new set of 25 filters can be signaled. If a new set is signalled for a slice, all the luma CTBs in the same slice share that set. For chroma component, when ALF is applied to a chroma CTB, if a new filter is signaled for a slice, the (chroma) CTB uses the new filter; otherwise, the most recent temporal chroma filter satisfying the temporal scalability constrain is applied. As the slice-level temporal filter, the APSs are updated as a first-in-first-out (FIFO) buffer. At CTU-level, the syntax table is provided in the following:

| | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_alf_enable_flag ){ | |

-continued

|  | Descriptor |
|---|---|
|     alf_ctb_flag[ 0 ][ xCtb >> Log2CtbSize ][ yCtb >> Log2CtbSize ] | ae(v) |
|     if (alf_ctb_flag[ 0 ][ xCtb >> Log2CtbSize ][ yCtb >> Log2CtbSize ] { | |
|         coding_alf_ctu_filter_set_index(CtbAddrInRs ) | |
|     } | |
|     if( alf_chroma_idc = = 1 \|\| alf_chroma_idc = = 3 ) | |
|         alf_ctb_flag[ 1 ][ xCtb >> Log2CtbSize ][ yCtb >> Log2CtbSize ] | ae(v) |
|     if( alf_chroma_idc = = 2 \|\| alf_chroma_idc = = 3 ) | |
|         alf_ctb_flag[ 2 ][ xCtb >> Log2CtbSize ][ yCtb >> Log2CtbSize ] | ae(v) |
| } | |
| if( slice_type = = I && qtbtt_dual_tree_intra_flag ) { | |
|     dual_tree_implicit_qt_split ( xCtb, yCtb, CtbLog2SizeY, 0 ) | |
| else | |
|     coding_quadtree( xCtb, yCtb, CtbLog2SizeY, 0, SINGLE_TREE ) | |
| } | |
| coding_alf_ctu_filter_set_index(CtbAddrInRs, slice_type){ | Descriptor |
|     xCtb = ( CtbAddrInRs % PicWidthInCtbsY ) << CtbLog2SizeY | |
|     yCtb = ( CtbAddrInRs / PicWidthInCtbsY ) << CtbLog2SizeY | |
|     alf_use_new_filter | ae(1) |
|       if (alf_use_new_filter == 0){ | |
|         alf_use_fixed_filter | ae(1) |
|       } | |
|     if (alf_use_new_filter){ | |
| alf_luma_ctb_filter_set_index[xCtb >> Log2CtbSize ][ yCtb >> Log2CtbSize ] = 16 | |
|     } | |
|       else if (alf_use_fixed_filter){ | |
|         alf_fixed_filter_index | tb(v) |
| alf_luma_ctb_filter_set_index[xCtb >> Log2CtbSize ][ yCtb >> Log2CtbSize ] = alf_fixed_filter_index | |
|     } | |
|     else{ | |
|         alf_temporal_index | tb(v) |
| alf_luma_ctb_filter_set_index[xCtb >> Log2CtbSize ][ yCtb >> Log2CtbSize ] = 16 + alf_temporal_index | |
|     } | |

In some embodiments, the filtering process of the Adaptive Loop Filter, is performed as follows:

$$O(x, y) = \sum_{(i,j)} w(i, j) \cdot I(x+i, y+j)$$

where samples I(x+i,y+j) are input samples, O(x,y) is the filtered output sample (i.e. filter result), and w(i,j) denotes the filter coefficients. In some embodiments, it is implemented using integer arithmetic for fixed point precision computations:

$$O(x, y) = \left( \sum_{i=-\frac{L}{2}}^{\frac{L}{2}} \sum_{j=-\frac{L}{2}}^{\frac{L}{2}} w(i, j) \cdot I(x+i, y+j) + 64 \right) >> 7$$

where L denotes the filter length, and where w(i,j) are the filter coefficients in fixed point precision. The equation can be reformulated as:

$$O(x, y) = I(x, y) + \sum_{(i,j) \neq (0,0)} w(i, j) \cdot (I(x+i, y+j) - I(x, y))$$

Using this above filter formula, nonlinearity can be introduced to make ALF more efficient by using a simple clipping function to reduce the impact of neighbor sample values (I(x+i, y+j)) when they are too different with the current sample value (I(x,y)) being filtered. In some embodiments, the ALF filter is modified as follows:

$$O'(x,y) = I(x,y) + \Sigma_{(i,j) \neq (0,0)} w(i,j) \cdot K(I(x+i,y+j) - I(x,y), k(i,j)).$$

K(d,b)=min (b, max(−b, d)) is the clipping function, and k(i,j) are clipping parameters, which depends on the (i,j) filter coefficients. The encoder performs the optimization to find the best k(i,j).

In some embodiments, the clipping parameters k(i,j) are specified for each ALF filter, one clipping value is signaled per filter coefficient. In other words, 12 clipping values are signalled in the bitstream per Luma filter and 6 clipping values for the Chroma filter. In order to limit the signaling cost and the encoder complexity, the evaluation of the clipping values is limited to a small set of possible values. In some embodiments, only 4 possible values are used on INTER slices and 3 possible values on INTRA slices. Because the variance of the local differences is often higher for Luma than for Chroma, two different sets are used for the Luma and Chroma filters. The maximum sample value (here 1024 for 10 bits bit-depth) are included in each set, so that clipping can be disabled if it is not necessary. Sets of allowed clipping values are provided according to the following:

|  | INTRA | INTER |
|---|---|---|
| LUMA | {10, 102, 1024} | {6, 32, 181, 1024} |
| CHROMA | {4, 24, 1024} | {4, 25, 161, 1024} |

The clipping values are encoded in the slice header using a k-th exponential-Golomb code corresponding to the index of the clipping value in the set. Moreover, only when the non-center coefficient is non-zero, then the corresponding clipping values are signaled. That is, before decoding the clipping value, the filter coefficients should be reconstructed first. An example corresponding syntax table is provided in the following:

|  | Descriptor |
|---|---|
| alf_data( ) { |  |
|     alf_chroma_idc | tu(v) |
|     alf_luma_clip | u(1) |
|     if( alf_choma_idc ) |  |
|         alf_chroma_clip | u(1) |
|     alf_luma_num_filters_signalled_minus1 | tb(v) |
|     if( alf_luma_num_filters_signalled_minus1 > 0 ) { |  |
|         for( filtIdx = 0; filtIdx < NumAlfFilters; filtIdx++ ) |  |
|             alf_luma_coeff_delta_idx[ filtIdx ] | tb(v) |
|     } |  |
|     alf_luma_coeff_delta_flag | u(1) |
|     if ( !alf_luma_coeff_delta_flag && alf_luma_num_filters_signalled_minus1 > 0 ) |  |
|         alf_luma_coeff_delta_prediction_flag | u(1) |
|     alf_luma_min_eg_order_minus1 | ue(v) |
|     for( i = 0; i < 3; i++ ) |  |
|         alf_luma_eg_order_increase_flag[ i ] | u(1) |
| if ( alf_luma_coeff_delta_flag ) { |  |
|     for( sigFiltIdx = 0; sigFiltIdx <= alf_luma_num_filters_signalled_minus1; sigFiltIdx++ ) |  |
|         alf_luma_coeff_flag[ sigFiltIdx ] | u(1) |
| } |  |
| for( sigFiltIdx = 0; sigFiltIdx <= alf_luma_num_filters_signalled_minus1; sigFiltIdx++ ) { |  |
|     if ( alf_luma_coeff_flag[ sigFiltIdx ] ) { |  |
|         for ( j = 0; j < 12; j++ ) { |  |
|             alf_luma_coeff_delta_abs[ sigFiltIdx ][ j ] | uek(v) |
|             if( alf_luma_coeff_delta_abs[ sigFiltIdx ][ j ] ) |  |
|                 alf_luma_coeff_delta_sign[ sigFiltIdx ][ j ] | u(1) |
|         } |  |
|     } |  |
| } |  |
| if( alf_luma_clip ) { |  |
|     alf_luma_clip_min_eg_order_minus1 | ue(v) |
|     for( i = 0; i < 3; i++ ) |  |
|         alf_luma_clip_eg_order_increase_flag[ i ] | u(1) |
|     for ( sigFiltIdx = 0; sigFiltIdx <= alf_luma_num filters_signalled_minus1; sigFiltIdx++ ) |  |
| { |  |
|     if ( alf_luma_coeff_flag[ sigFiltIdx ] ) { |  |
|         for ( j = 0; j < 12; j++ ) { |  |
|             if( filterCoefficients[ sigFiltIdx ][ j ] ) |  |
|                 alf_luma_clip_idx[ sigFiltIdx ][ j ] | uek(v) |
|         } |  |
|     } |  |
| } |  |
| if ( alf_chroma_idc > 0 ) { |  |
|     alf_chroma_min_eg_order_minus1 | ue(v) |
|     for( i = 0; i < 2; i++) |  |
|         alf_chroma_eg_order_increase_flag[ i ] | u(1) |
|     for( j = 0; j < 6; j++ ) { |  |
|         alf_chroma_coeff_abs[ j ] | uek(v) |
|         if( alf_chroma_coeff_abs[ j ] > 0 ) |  |
|             alf_chroma_coeff_sign[ j ] | u(1) |
|     } |  |
| } |  |
| if ( alf_chroma_idc > 0 && alf_chroma_clip ) { |  |
|     alf_chroma_clip_min_eg_order_minus1 | ue(v) |
|     for( i = 0; i < 2; i++ ) |  |
|         alf_chroma_clip_eg_order_increase_flag[ i ] | u(1) |
|     for( j = 0; j < 6; j++ ) { |  |
|         if ( alf_chroma_coeff_abs[ j ] ) |  |
|             alf_chroma_clip_idx[ j ] | uek(v) |
|     } |  |
| } |  |
| } |  | selection of temporal filters for ALF instead of using the index in APS FIFO in some embodiments. In some embodiments, this signaling mechanism is used for CTB-based ALF. When multiple temporal filters are allowed and switched at some level (e.g. CTB level), the APS IDs of temporal filters used in current tile group are signaled. In some embodiments, the new signaled filter set in slice/tile-group header are also moved to APS and the corresponding APS ID are signaled in slice/tile-group header. For chroma ALF, when it is enabled, the filter selection may also be signaled in slice/tile-group header, instead of implicit selec- When the selected temporal filter is signaled by using the index in APS FIFO and the APS ID is not used directly, the possibility or the combination of using the coded APS for current tile group is restricted. This may also introduce some error propagation when an APS is missing or duplicated. In order to avoid these issues, APS ID is used to indicate the tion in FIFO, such that a decoder can parse the filter selection from the slice/tile-group header. An example corresponding syntax table is provided in the following:

```
slice_header( ) {
    slice_pic_parameter_set_id
    ...
    ...
    if( sps_alf_enabled_flag ) {
        slice_luma_alf_enabled_flag
        if( slice_luma_alf_enabled_flag ) {
            num_luma_alf_aps_ids_minus1
            for( i = 0; i <= num_alf_aps_ids_minus1; i++ )
                slice_luma_alf_aps_id[ i ]
            slice_alf_chroma_idc
            if (slice_alf_chroma_idc) {
                slice_chroma_alf_aps_id
            }
        }
    }
}
```

In some embodiments, the chroma filter is included in the luma APSs, so only the index among the luma APS used for chroma ALF is coded, instead of an actual APS ID (specifically for chroma). An example corresponding syntax table is provided in the following:

|  | Descriptor |
| --- | --- |
| slice_header( ) { |  |
|    slice_pic_parameter_set_id | ue(v) |
|    ... |  |
|    ... |  |
|    if( sps_alf_enabled_flag ) { |  |
|       slice_luma_alf_enabled_flag | u(1) |
|       if( slice_luma_alf_enabled_flag ) { |  |
|          num_luma_alf_aps_ids_minus1 | ue(v) |
|          for( i = 0; i <= num_alf_aps_ids_minus1; i++ ) |  |
|             slice_luma_alf_aps_id[ i ] | u(5) |
|          slice_alf_chroma_idc | ue(v) |
|          if (slice_alf_chroma_idc && num_luma_alf_aps_ids_minus1) { |  |
|             slice_chroma_alf_index | ue(v) |
|          } |  |
|       } |  |
|    } |  |

If there is only one luma APS, then the chroma filter is inferred to be the chroma filter in this APS. In some embodiments, the chroma ALF filter is inherited from one of signaled APS. For example, the chroma ALF is inherited from the first signaled APS. In this case, there is no chroma ALF syntax (e.g. slice_alf_chroma_idc or slice_chroma_alf_index) signaled in slice header. At CTB level, since the new signaled filter set is also moved to one APS, then the syntax table at CTB level can be further optimized as the follows. One flag is coded to indicate the selected filter set is from multiple filter sets in different APSs or from fixed filter sets. And one filter set index is coded to indicate the selected filter set index is in multiple filter sets of different APSs or of fixed filter sets, respectively. An example corresponding syntax table is provided in the following:

|  | Descriptor |
| --- | --- |
| coding_alf_ctu_filter_set_index(CtbAddrInRs, slice_type ){ |  |
|    xCtb = ( CtbAddrInRs % PicWidthInCtbsY ) << CtbLog2SizeY |  |
|    yCtb = ( CtbAddrInRs / PicWidthInCtbsY ) << CtbLog2SizeY |  |
|    alf_use_aps_filter_set | ae(1) |
|    if (alf_use_aps_filter_set == 0){ |  |
|       alf_fixed_filter_index | tb(v) |
|    } else { |  |
|       if ( num_luma_alf_aps_ids_minus1 ) |  |
|          alf_aps_index | tb(v) |
| } |  |

In some embodiments, the corresponding clipping values are signaled only when the non-center coefficient is non-zero. That is, before decoding the clipping value, the filter coefficients are reconstructed first. However, this may introduce some latency or parsing throughput issue. In some embodiments, the corresponding clipping values are always signaled, even if the non-center coefficient is zero. In some embodiment, the corresponding clipping values are always signaled, when filter coefficient prediction is used. But if the filter coefficient prediction is not enabled, then the corresponding clipping values are conditionally signaled. An example corresponding syntax table is provided in the following:

```
alf_data( ) {
    alf_chroma_idc
    alf_luma_clip
    if( alf_choma_idc )
        alf_chroma_clip
```

```
        ...
        if ( !alf_luma_coeff_delta_flag && alf_luma_num_filters_signalled_minus1 > 0 )
            alf_luma_coeff_delta_prediction_flag
        ...
        if( alf_luma_clip ) {
            alf_luma_clip_min_eg_order_minus1
            for( i = 0; i < 3; i++ )
                alf_luma_clip_eg_order_increase_flag[ i ]
            for ( sigFiltIdx = 0; sigFiltIdx <= alf_luma_num_filters_signalled_minus1; sigFiltIdx++ )
{
                if ( alf_luma_coeff_flag[ sigFiltIdx ] ) {
                    for ( j = 0; j < 12; j++ ) {
                        if ( filterCoefficients[ sigFiltIdx ][ j ] || alf_luma_coeff_delta_prediction_flag)
                            alf_luma_clip_idx[ sigFiltIdx ][ j ]
                    }
                }
            }
        }
        ...
```

When fixed filter sets are allowed, then the filter coefficients defined in the fixed filters can also be used to predict filter coefficients. In some embodiments, when filter coefficient prediction is enabled (i.e. the predictor can be one fixed filter or the previous signaled filter), the clipping values are always signaled. If the filter coefficient prediction is disabled, then the clipping values are signaled when the filter coefficient is non-zero. An example corresponding syntax table is provided in the following:

```
        for ( sigFiltIdx = 0; sigFiltIdx <=
alf_luma_num_filters_signalled_minus1; sigFiltIdx++ ) {
            if ( alf_luma_coeff_flag[ sigFiltIdx ] ) {
                for ( j = 0; j < 12; j++ ) {
                    if( filterCoefficients[ sigFiltIdx ][ j ]
                    || alf_luma_coeff_delta_prediction_flag
                    || ( alf_luma_use_fixed_filter_flag && alf_luma_fixed_filter_usage[
filtidx ]))
                        alf_luma_clip_idx[ sigFiltIdx ][ j ]         uek(v)
                }
            }
        }
```

In some embodiments, the syntax of signaling clipping values is simplified. The k-th order exponential Golomb codes are replaced by one fixed-length code, for example, two bits or truncated unary codes. An example corresponding syntax table for ALF data is provided in the following:

|  | Descriptor |
|---|---|
| alf_data( ) { | |
| ... | |
| if ( alf_luma_clip ) { | |
|     for ( sigFiltIdx = 0; sigFiltIdx <= alf_luma_num_filters_signalled_minus1; sigFiltIdx++ ) { | |
|         if ( alf_luma_coeff_flag[ sigFiltIdx ] ) { | |
|             for ( j = 0; j < 12; j++ ) { | |
|                 if( filterCoefficients [ sigFiltIdx ][ j ]) | |
|                     alf_luma_clip_idx[ sigFiltIdx ][ j ] | u(2) |
|             } | |
|         } | |
|     } | |
| } | |
| ... | |
| if ( alf_chroma_idc > 0 && alf_chroma_clip ) { | |
|     for( j = 0; j < 6; j++ ) { | |
|         if ( alf_chroma_coeff_abs[ j ] ) | |

|  | Descriptor |
|---|---|
|             alf_chroma_clip_idx[ j ] | u(2) |
|     } | |
| } | |
| ... | |

Another example corresponding syntax table for ALF data is provided in the following:

|  | Descriptor |
|---|---|
| alf_data( ) { | |
| ... | |
| if( alf_luma_clip ) { | |
|     for ( sigFiltIdx = 0; sigFiltIdx <= alf_luma_num_filters_signalled_minus1; sigFiltIdx++ ) { | |
|         if ( alf_luma_coeff_flag[ sigFiltIdx ] ) { | |
|             for ( j = 0; j < 12; j++ ) { | |
|                 if( filterCoefficients[ sigFiltIdx ][ j ] || alf_luma_coeff_delta_prediction_flag) | |
|                     alf_luma_clip_idx[ sigFiltIdx ][ j ] | tu(v) |
|             } | |
|         } | |
|     } | |
| } | |
| ... | |
| if ( alf_chroma_idc > 0 && alf_chroma_clip ) { | |
|     for( j = 0; j < 6; j++ ) { | |
|         if( alf_chroma_coeff_abs[ j ] ) | |

| Descriptor |
|---|
| alf_chroma_clip_idx[ j ] tu(v) |
} 
}
...

The foregoing proposed method can be implemented in encoders and/or decoders. For example, the proposed method can be implemented in a loop filtering module of an encoder, and/or a loop filtering module of a decoder.

Example Video Encoder

Figure 5:
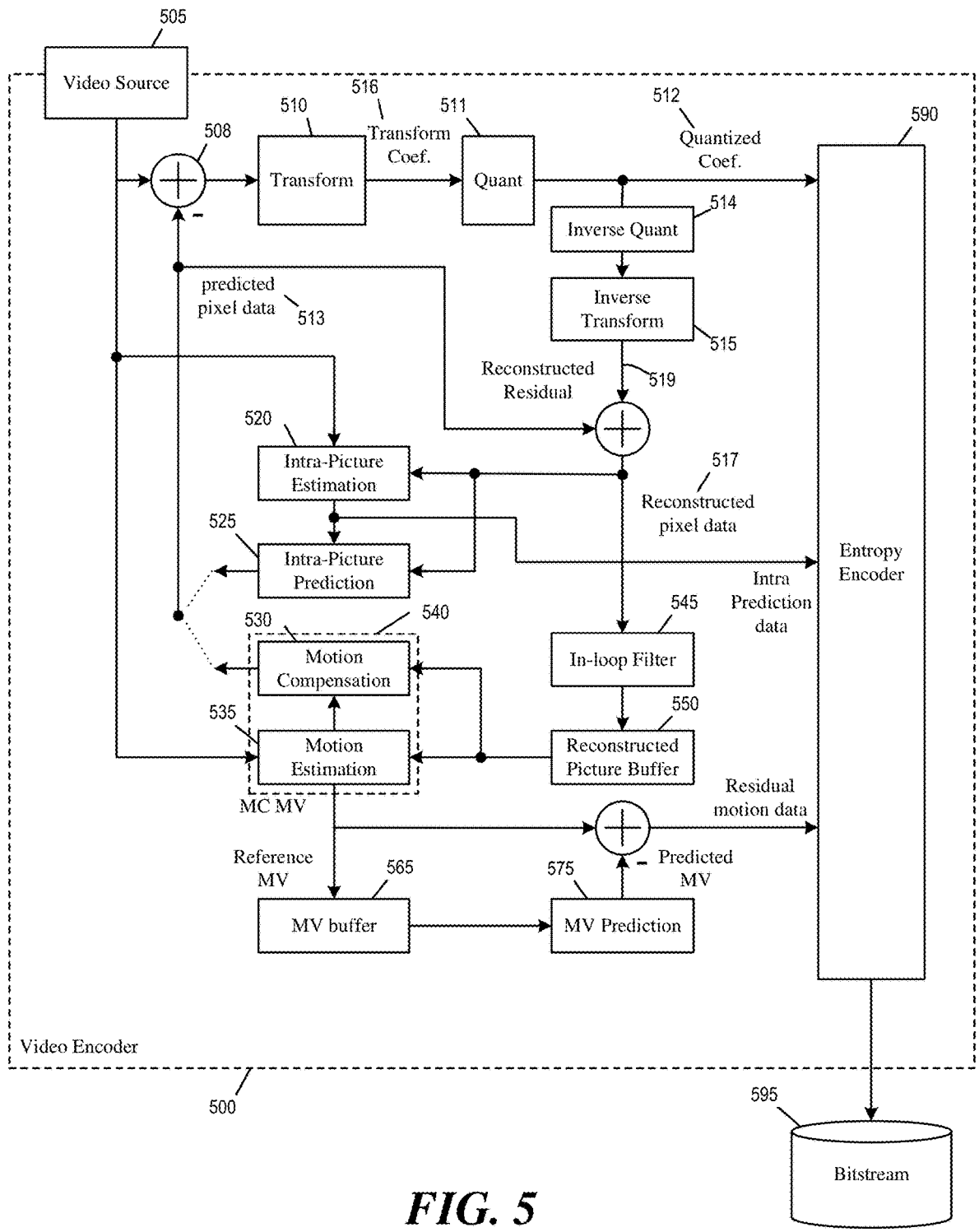
FIG. 5 illustrates an example video encoder that applies adaptive loop filtering.

FIG. 5 illustrates an example video encoder 500 that applies adaptive loop filtering. As illustrated, the video encoder 500 receives input video signal from a video source 505 and encodes the signal into bitstream 595. The video encoder 500 has several components or modules for encoding the signal from the video source 505, at least including some components selected from a transform module 510, a quantization module 511, an inverse quantization module 514, an inverse transform module 515, an intra-picture estimation module 520, an intra-prediction module 525, a motion compensation module 530, a motion estimation module 535, an in-loop filter 545, a reconstructed picture buffer 550, a MV buffer 565, and a MV prediction module 575, and an entropy encoder 590. The motion compensation module 530 and the motion estimation module 535 are part of an inter-prediction module 540.

In some embodiments, the modules 510-590 are modules of software instructions being executed by one or more processing units (e.g., a processor) of a computing device or electronic apparatus. In some embodiments, the modules 510-590 are modules of hardware circuits implemented by one or more integrated circuits (ICs) of an electronic apparatus. Though the modules 510-590 are illustrated as being separate modules, some of the modules can be combined into a single module.

The video source 505 provides a raw video signal that presents pixel data of each video frame without compression. A subtractor 508 computes the difference between the raw video pixel data of the video source 505 and the predicted pixel data 513 from the motion compensation module 530 or intra-prediction module 525. The transform module 510 converts the difference (or the residual pixel data or residual signal 509) into transform coefficients (e.g., by performing Discrete Cosine Transform, or DCT). The quantization module 511 quantizes the transform coefficients into quantized data (or quantized coefficients) 512, which is encoded into the bitstream 595 by the entropy encoder 590.

The inverse quantization module 514 de-quantizes the quantized data (or quantized coefficients) 512 to obtain transform coefficients, and the inverse transform module 515 performs inverse transform on the transform coefficients to produce reconstructed residual 519. The reconstructed residual 519 is added with the predicted pixel data 513 to produce reconstructed pixel data 517. In some embodiments, the reconstructed pixel data 517 is temporarily stored in a line buffer (not illustrated) for intra-picture prediction and spatial MV prediction. The reconstructed pixels are filtered by the in-loop filter 545 and stored in the reconstructed picture buffer 550. In some embodiments, the reconstructed picture buffer 550 is a storage external to the video encoder 500. In some embodiments, the reconstructed picture buffer 550 is a storage internal to the video encoder 500.

The intra-picture estimation module 520 performs intra-prediction based on the reconstructed pixel data 517 to produce intra prediction data. The intra-prediction data is provided to the entropy encoder 590 to be encoded into bitstream 595. The intra-prediction data is also used by the intra-prediction module 525 to produce the predicted pixel data 513.

The motion estimation module 535 performs inter-prediction by producing MVs to reference pixel data of previously decoded frames stored in the reconstructed picture buffer 550. These MVs are provided to the motion compensation module 530 to produce predicted pixel data.

Instead of encoding the complete actual MVs in the bitstream, the video encoder 500 uses MV prediction to generate predicted MVs, and the difference between the MVs used for motion compensation and the predicted MVs is encoded as residual motion data and stored in the bitstream 595.

The MV prediction module 575 generates the predicted MVs based on reference MVs that were generated for encoding previously video frames, i.e., the motion compensation MVs that were used to perform motion compensation. The MV prediction module 575 retrieves reference MVs from previous video frames from the MV buffer 565. The video encoder 500 stores the MVs generated for the current video frame in the MV buffer 565 as reference MVs for generating predicted MVs.

The MV prediction module 575 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 595 by the entropy encoder 590.

The entropy encoder 590 encodes various parameters and data into the bitstream 595 by using entropy-coding techniques such as context-adaptive binary arithmetic coding (CABAC) or Huffman encoding. The entropy encoder 590 encodes various header elements, flags, along with the quantized transform coefficients 512, and the residual motion data as syntax elements into the bitstream 595. The bitstream 595 is in turn stored in a storage device or transmitted to a decoder over a communications medium such as a network.

The in-loop filter 545 performs filtering or smoothing operations on the reconstructed pixel data 517 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 6:
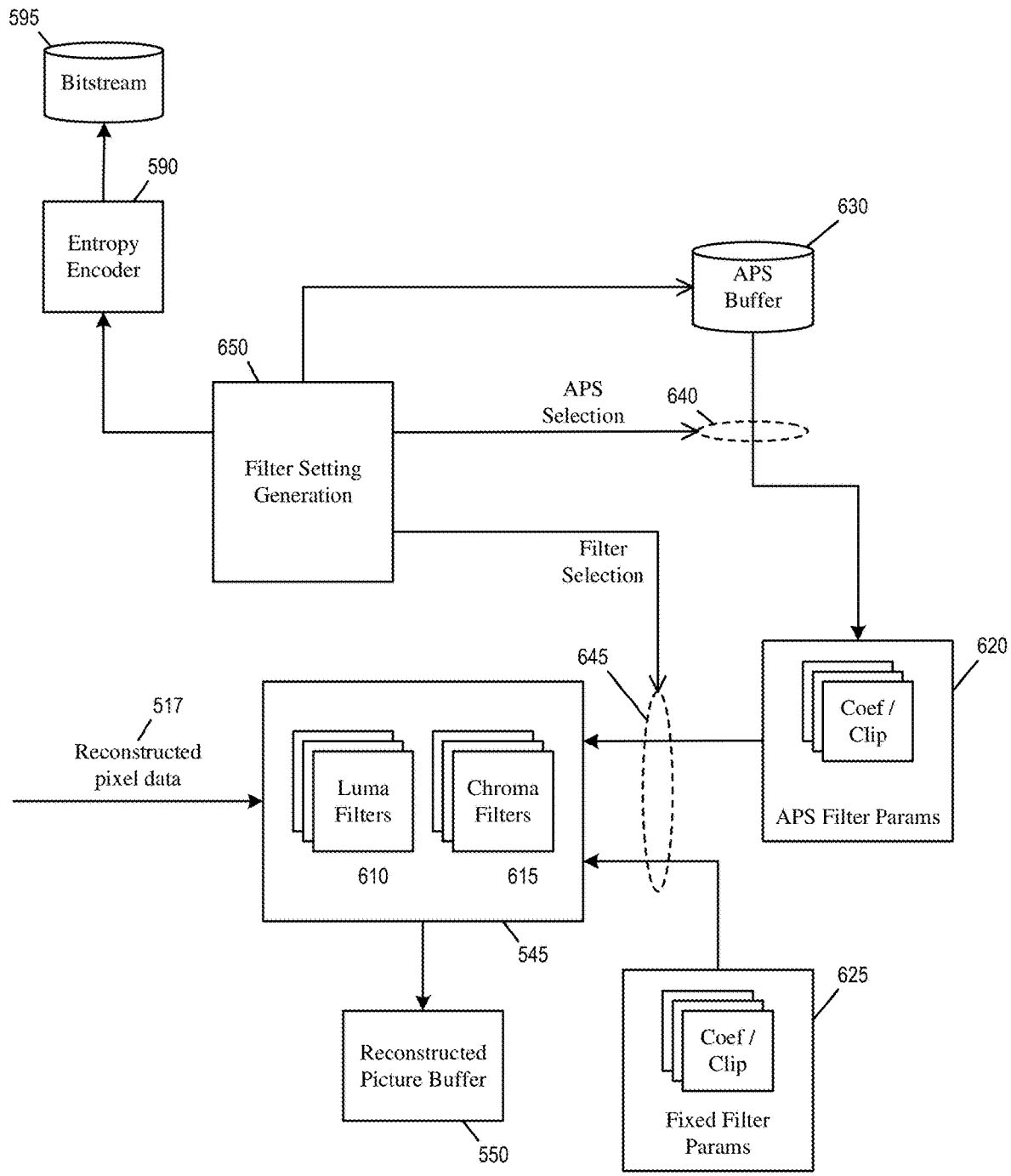
FIG. 6 illustrates portions of the video encoder that performs ALF operations.

FIG. 6 illustrates portions of the video encoder 500 that performs ALF operations. Specifically, the figure illustrates parameters that are signaled in the bitstream 595 being used to determine the operations of the in-loop filter 545. The in-loop filter 545 applies ALF filtering to luma and chroma components of the reconstructed pixel data 517. The filtered pixels are in turn stored in the reconstructed picture buffer 550.

The ALF filtering of the in-loop filter 545 is performed by a set of luma filters 610 and a set of chroma filters 615. Each luma or chroma filter performs filtering for a block of pixels, which may be a CTB or a smaller unit of pixels such as a 4×4 sub-block. Each luma or chroma filter performs filtering operations according to a set of ALF parameters that are used to derive filtering coefficients and clipping values. The ALF parameters of each luma or chroma filter is provided by either APS filter parameters 620 or fixed filter parameters 625. The fixed filter parameters 625 are hard-wired default values that are built into the video encoder. The APS filter parameters 620 are provided one APS. Both APS filter parameters 620 and fixed filter parameters 625 include multiple sets (e.g., 25) of filter settings (or ALF parameters). Each of the luma and chroma filters 610 and 615 may select and use a set of filter setting (filter coefficients and clipping values) from the multiple sets of filter settings.

For each luma or chroma filter, a set of filter selection signals 640 are used to retrieve filter settings from APS filter parameters 620 or fixed filter parameters 625. For example, a flag (e.g., use_aps) is used to indicate whether to use parameters from APS filter parameters 620 or to use parameters from fixed filter parameters 625. An index (e.g., index_of_aps_filter) is used to select one filter setting from multiple filter settings in the APS filter parameters 620. An index (e.g., fixed_index) is used to select one filter setting from multiple filter settings in the fixed filter parameters 625.

The content of the APS filter parameters 620 belongs to one APS, which may include parameters for 25 different filters settings for luma and chroma components. As APSs are coded into the bitstream 595, they are stored in the APS buffer 620. A set of APS selection signals 645 select one of the APSs stored in the APS buffer 630 to serve as the APS filter parameters 620.

The APS selection signals 645 may include an APS identifier (e.g., slice_chroma_alf_aps_id, slice_luma_alf_aps_id) for selecting an APS from among the multiple APSs stored in the APS buffer 620. In some embodiment, the APS identifier identifies temporal filters used in a current slice or tile group that encompass the current block. In some embodiments, parameters for filtering chroma component are included in an APS for luma component. In other words, luma filter settings in APS can be selected and used as chroma filter settings such that only an index among the luma APS is used for selecting the chroma filter settings and that no APS identifier is needed to select an APS for filtering chroma pixels.

In some embodiments, a filter setting generation module 650 generates APS to be stored in the APS buffer 630, as well as the APS selection signal 640 and the filter selection signal 645. The entropy encoder 590 in turn encodes the generated APS, the filter selection signals 640, and the APS selection signals 645 as syntax elements in the bitstream 595 at various levels (CTB level, slice level, etc.)

Figure 7:
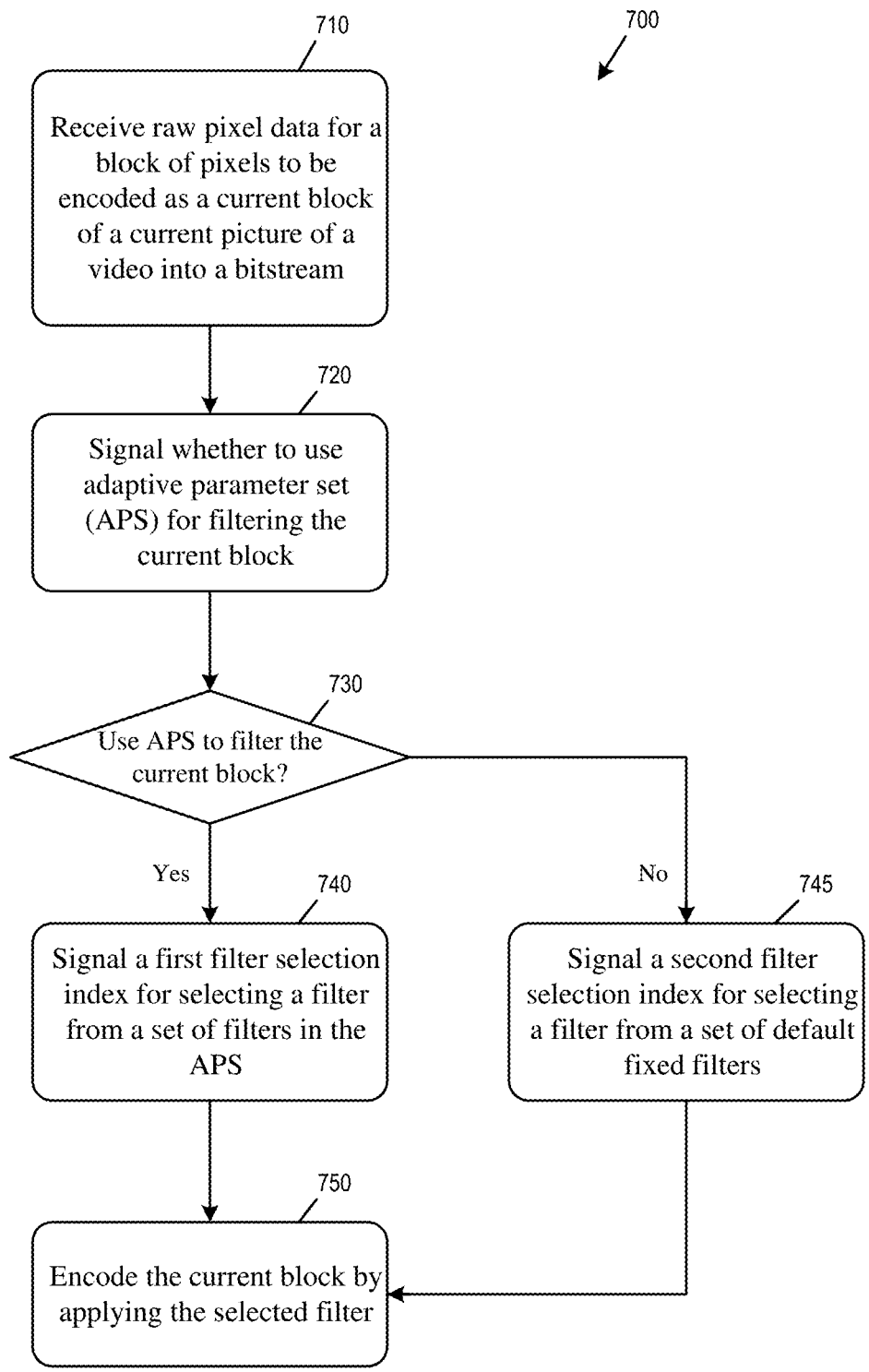
FIG. 7 conceptually illustrates a process for signaling selections of ALF parameters or filter settings by a video encoder.

FIG. 7 conceptually illustrates a process 700 for signaling selections of ALF parameters or filter settings by a video encoder. In some embodiments, one or more processing units (e.g., a processor) of a computing device implementing the encoder 500 performs the process 700 by executing instructions stored in a computer readable medium. In some embodiments, an electronic apparatus implementing the encoder 500 performs the process 700.

The encoder receives (at block 710) raw pixel data for a block of pixels to be encoded as a current block of a current picture of a video into a bitstream. In some embodiments, the current block is a coding tree block (CTB) for luma or chroma component of a coding tree unit (CTU).

The encoder signals (at block 720) whether to use adaptive parameter set (APS) for filtering the current block (e.g., use_aps). An APS includes corresponding filter coefficients and clipping values for adaptive loop filter (ALF). In some embodiments, the APS includes multiple sets of filters applicable to luma and chroma CTBs, but the encoder does not determine whether to select a particular APS from a plurality of APSs for filtering the current block (e.g., without examining slice_num_alf_aps_id_luma or signaling alf_ctb_use_first_aps_flag.)

The encoder determines (at block 730) whether APS is used to filter the current block. In some embodiments, the flag indicating whether to use APS for filtering the current block is inferred to be true or false based on chroma format, chroma indicator, or slice type. When the APS is used to filter the current block, the process proceeds to block 740. When the APS is not used to filter the current block, the process proceeds to block 745.

The encoder signals (at block 740) a first filter selection index (e.g., index_of_aps_filters) for selecting a filter from a set of filters in the APS. In some embodiments, the APS is selected from a plurality of APSs by using an APS identifier that is signaled in a slice header. The APS identifier may be used to select an APS for providing a filter for luma pixels of the current block. (e.g., slice_luma_alf_aps_id). The APS identifier may be used to select an APS for providing a filter for chroma pixels of the current block. (e.g., slice_chroma_alf_aps_id). The process then proceeds to block 750.

The encoder signals (at block 745) a second filter selection index (e.g., fixed_index) for selecting a filter from a set of default fixed filters that are predefined or hardcoded in the encoder and not changed by the APSs being signaled.

The encoder encodes (at block 750) the current block by applying the selected filter.

Example Video Decoder

Figure 8:
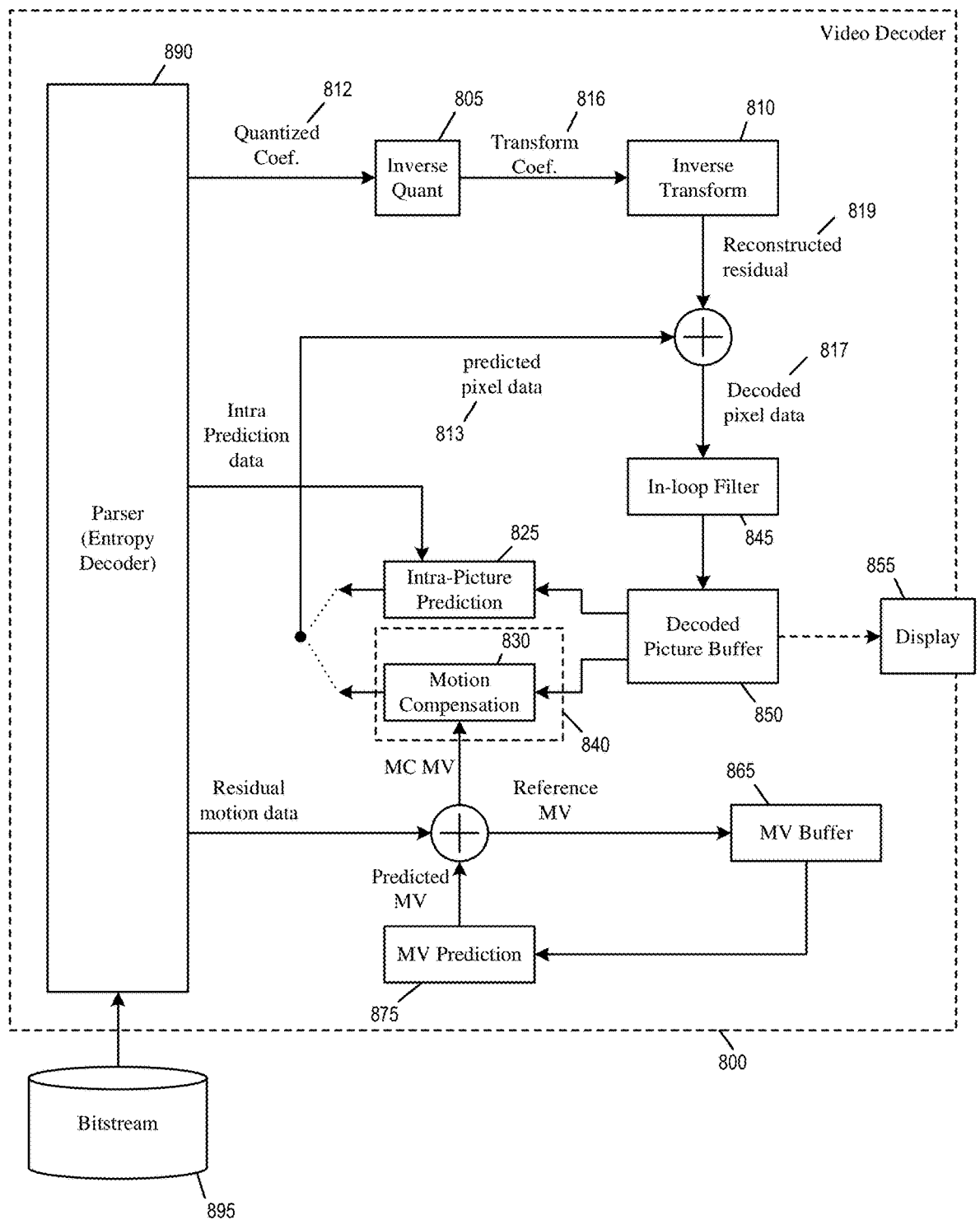
FIG. 8 illustrates an example video decoder that applies adaptive loop filtering.

FIG. 8 illustrates an example video decoder 800 that applies adaptive loop filtering. As illustrated, the video decoder 800 is an image-decoding or video-decoding circuit that receives a bitstream 895 and decodes the content of the bitstream into pixel data of video frames for display. The video decoder 800 has several components or modules for decoding the bitstream 895, including some components selected from an inverse quantization module 805, an inverse transform module 810, an intra-prediction module 825, a motion compensation module 830, an in-loop filter 845, a decoded picture buffer 850, a MV buffer 865, a MV prediction module 875, and a parser 890. The motion compensation module 830 is part of an inter-prediction module 840.

In some embodiments, the modules 810-890 are modules of software instructions being executed by one or more processing units (e.g., a processor) of a computing device. In some embodiments, the modules 810-890 are modules of hardware circuits implemented by one or more ICs of an electronic apparatus. Though the modules 810-890 are illustrated as being separate modules, some of the modules can be combined into a single module.

The parser 890 (or entropy decoder) receives the bitstream 895 and performs initial parsing according to the syntax defined by a video-coding or image-coding standard. The parsed syntax element includes various header elements, flags, as well as quantized data (or quantized coefficients) 812. The parser 890 parses out the various syntax elements by using entropy-coding techniques such as context-adaptive binary arithmetic coding (CABAC) or Huffman encoding.

The inverse quantization module 805 de-quantizes the quantized data (or quantized coefficients) 812 to obtain transform coefficients, and the inverse transform module 810 performs inverse transform on the transform coefficients 816 to produce reconstructed residual signal 819. The reconstructed residual signal 819 is added with predicted pixel data 813 from the intra-prediction module 825 or the motion compensation module 830 to produce decoded pixel data 817. The decoded pixels data are filtered by the in-loop filter 845 and stored in the decoded picture buffer 850. In some embodiments, the decoded picture buffer 850 is a storage external to the video decoder 800. In some embodiments, the decoded picture buffer 850 is a storage internal to the video decoder 800.

The intra-prediction module 825 receives intra-prediction data from bitstream 895 and according to which, produces the predicted pixel data 813 from the decoded pixel data 817 stored in the decoded picture buffer 850. In some embodiments, the decoded pixel data 817 is also stored in a line buffer (not illustrated) for intra-picture prediction and spatial MV prediction.

In some embodiments, the content of the decoded picture buffer 850 is used for display. A display device 855 either retrieves the content of the decoded picture buffer 850 for display directly or retrieves the content of the decoded picture buffer to a display buffer. In some embodiments, the display device receives pixel values from the decoded picture buffer 850 through a pixel transport.

The motion compensation module 830 produces predicted pixel data 813 from the decoded pixel data 817 stored in the decoded picture buffer 850 according to motion compensation MVs (MC MVs). These motion compensation MVs are decoded by adding the residual motion data received from the bitstream 895 with predicted MVs received from the MV prediction module 875.

The MV prediction module 875 generates the predicted MVs based on reference MVs that were generated for decoding previous video frames, e.g., the motion compensation MVs that were used to perform motion compensation. The MV prediction module 875 retrieves the reference MVs of previous video frames from the MV buffer 865. The video decoder 800 stores the motion compensation MVs generated for decoding the current video frame in the MV buffer 865 as reference MVs for producing predicted MVs.

The in-loop filter 845 performs filtering or smoothing operations on the decoded pixel data 817 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 9:
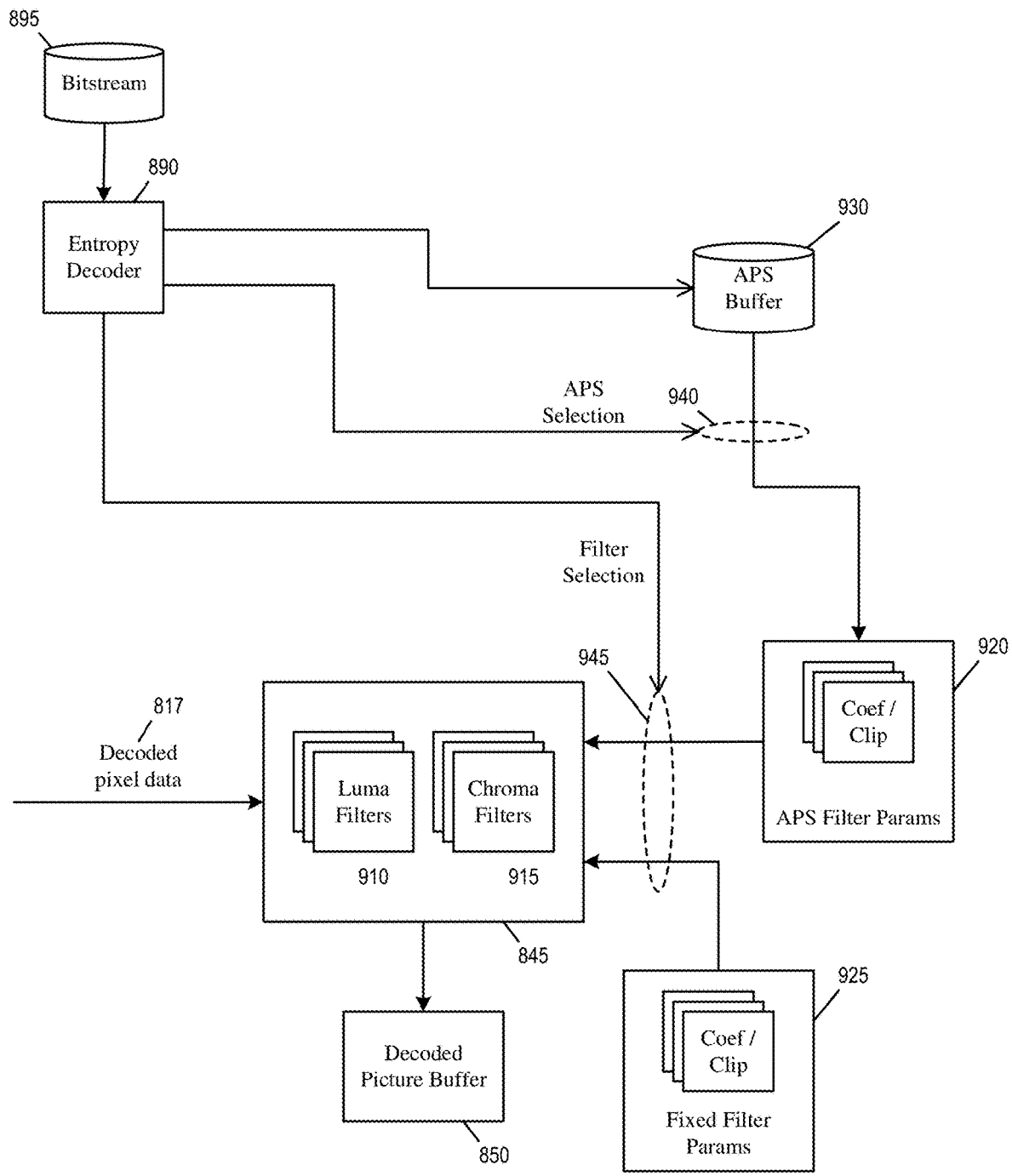
FIG. 9 illustrates portions of the video decoder that performs ALF operations.

FIG. 9 illustrates portions of the video decoder 800 that performs ALF operations. Specifically, the figure illustrates parameters that are signaled in the bitstream 895 being used to determine the operations of the in-loop filter 845. The in-loop filter 845 applies ALF filtering to luma and chroma components of the decoded pixel data 817. The filtered pixels are in turn stored in the decoded picture buffer 850.

The ALF filtering of the in-loop filter 845 is performed by a set of luma filters 910 and a set of chroma filters 915. Each luma or chroma filter performs filtering for a block of pixels, which may be a CTB or a smaller unit of pixels such as a 4×4 sub-block. Each luma or chroma filter performs filtering operations according to a set of ALF parameters that are used to derive filtering coefficients and clipping values. The ALF parameters of each luma or chroma filter is provided by either APS filter parameters 920 or fixed filter parameters 925. The fixed filter parameters 925 are hard-wired default values that are built into the video decoder. The APS filter parameters 920 are provided by APSs. Both APS filter parameters 920 and fixed filter parameters 925 include multiple sets (e.g., 25) of filter settings (or ALF parameters). Each of the luma and chroma filters 910 and 915 may select and use a set of filter setting (filter coefficients and clipping values) from the multiple sets of filter settings.

For each luma or chroma filter, a set of filter selection signals 940 are used to retrieve filter settings from APS filter parameters 920 or fixed filter parameters 925. For example, a flag (e.g., use_aps) is used to indicate whether to use parameters from APS filter parameters 920 or to use parameters from fixed filter parameters 925. An index (e.g., index_of_aps_filter) is used to select one filter setting from multiple filter settings in the APS filter parameters 920. An index (e.g., fixed_index) is used to select one filter setting from multiple filter settings in the fixed filter parameters 925.

The content of the APS filter parameters 920 belongs to one APS, which may include parameters for 25 different filters settings for luma and chroma components. As APSs are parsed from the bitstream 895, they are stored in the APS buffer 920. A set of APS selection signals 945 select one of the APSs stored in the APS buffer 930 to serve as the APS filter parameters 920.

The APS selection signals 945 may include an APS identifier (e.g., slice_chroma_alf_aps_id, slice_luma_alf_aps_id) for selecting an APS from among the multiple APSs stored in the APS buffer 920. In some embodiment, the APS identifier identifies temporal filters used in a current slice or tile group that encompass the current block. In some embodiments, parameters for filtering chroma component are included in an APS for luma component. In other words, luma filter settings in APS can be selected and used as chroma filter settings such that only an index among the luma APS is used for selecting the chroma filter settings and that no APS identifier is needed to select an APS for filtering chroma pixels.

In some embodiments, the entropy decoder 890 parses the bitstream 895 to obtain APS, the filter selection signals 940, and the APS selection signals 945. These signals are coded as syntax elements in the bitstream 895 at different levels (CTB level, slice header, etc.)

Figure 10:
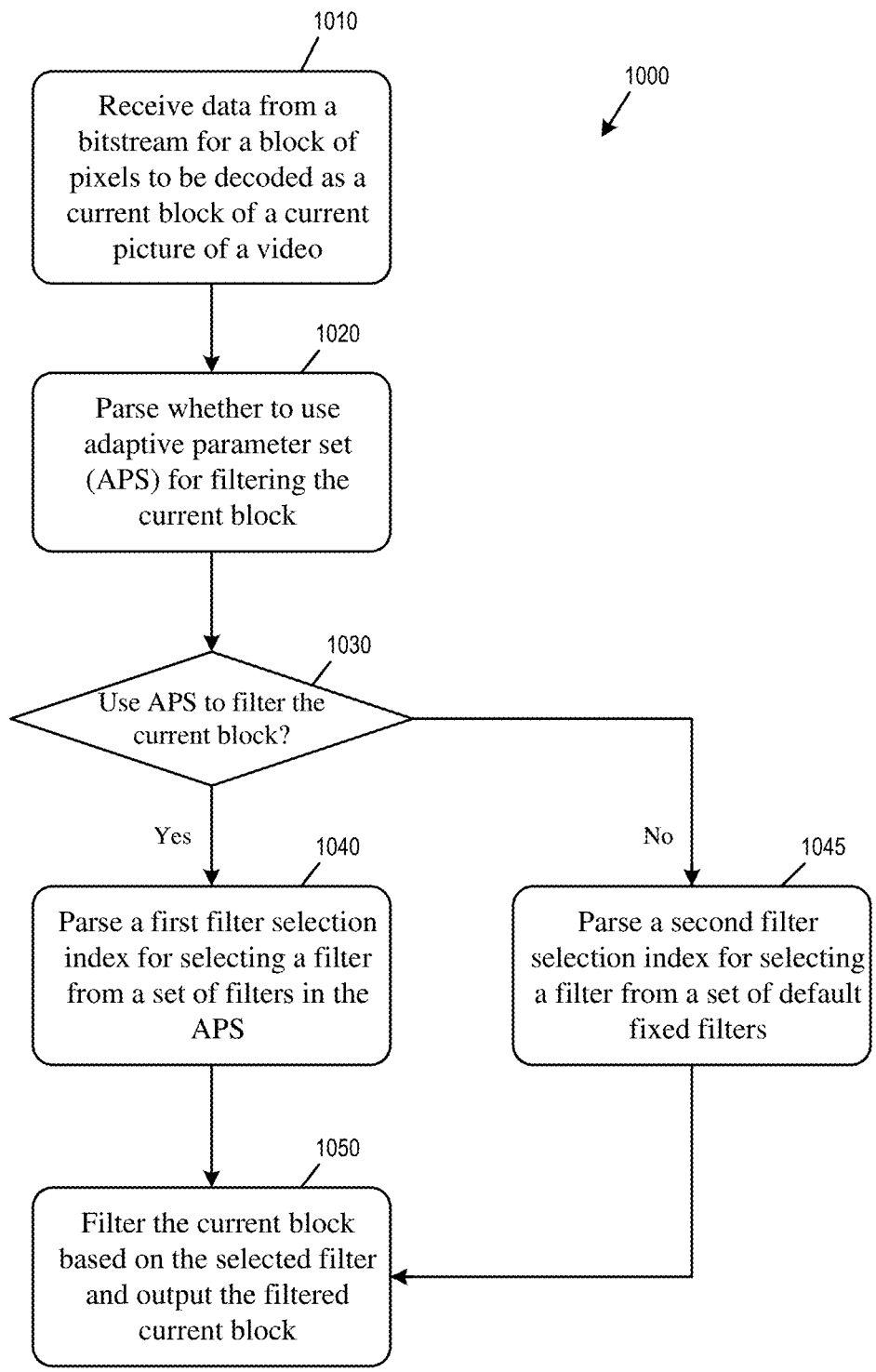
FIG. 10 conceptually illustrates a process for signaling selections of ALF parameters or filter settings by a video decoder.

FIG. 10 conceptually illustrates a process 1000 for signaling selections of ALF parameters or filter settings by a video decoder. In some embodiments, one or more processing units (e.g., a processor) of a computing device implementing the decoder 800 performs the process 1000 by executing instructions stored in a computer readable medium. In some embodiments, an electronic apparatus implementing the decoder 800 performs the process 1000.

The decoder receives (at block 1010) data from a bitstream for a block of pixels to be decoded as a current block of a current picture of a video. In some embodiments, the current block is a coding tree block (CTB) for luma or chroma component of a coding tree unit (CTU). The decoder also receives syntax elements from the bitstream that the decoder uses to signal for controlling ALF filtering operations.

The decoder parses (at block 1020) whether to use adaptive parameter set (APS) for filtering the current block (e.g., use_aps). An APS includes information used to derive filter coefficients and clipping values for adaptive loop filter (ALF). In some embodiments, the APS includes multiple sets of filters applicable to luma and chroma CTBs, but the decoder does not determine whether to select a particular APS from a plurality of APSs for filtering the current block (e.g., without examining slice_num_alf_aps_id_luma or parsing alf_ctb_use_first_aps_flag).

The decoder determines (at block 1030) whether APS is used to filter the current block. In some embodiments, the flag indicating whether to use APS for filtering the current block is inferred to be true or false based on chroma format, chroma indicator, or slice type. When the APS is used to filter the current block, the process proceeds to block 1040. When the APS is not used to filter the current block, the process proceeds to block 1045.

The decoder parses (at block 1040) a first filter selection index (e.g., index_of_aps_filters) for selecting a filter from a set of filters in the APS. In some embodiments, the APS is selected from a plurality of APSs by using an APS identifier that is signaled in (or parsed from) a slice header. The APS identifier may be used to select an APS for providing a filter for luma pixels of the current block. (e.g., slice_luma_alf_aps_id). The APS identifier may be used to select an APS for providing a filter for chroma pixels of the current block. (e.g., slice_chroma_alf_aps_id). The process then proceeds to block 1050.

The decoder parses (at block 1045) a second filter selection index (e.g., fixed_index) for selecting a filter from a set of default fixed filters that are predefined or hardcoded in the decoder and not changed by the APSs being signaled.

The decoder filters (at block 1050) the current block based on the selected filter and outputs the filtered current block.

Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 11:
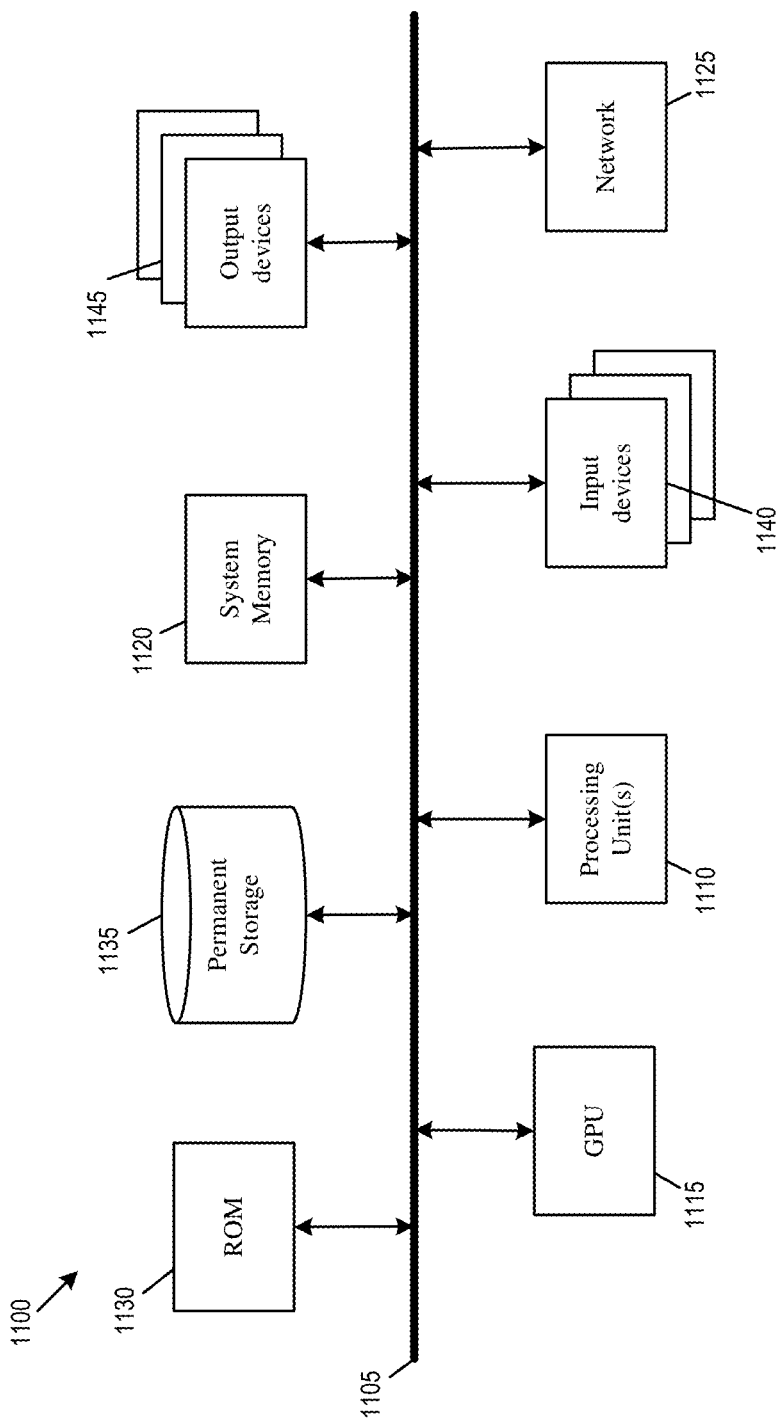
FIG. 11 conceptually illustrates an electronic system with which some embodiments of the present disclosure are implemented.

FIG. 11 conceptually illustrates an electronic system 1100 with which some embodiments of the present disclosure are implemented. The electronic system 1100 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1100 includes a bus 1105, processing unit(s) 1110, a graphics-processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the GPU 1115, the read-only memory 1130, the system memory 1120, and the permanent storage device 1135.

From these various memory units, the processing unit(s) 1110 retrieves instructions to execute and data to process in order to execute the processes of the present disclosure. The processing unit(s) may be a single processor or a multi-core processor in different embodiments. Some instructions are passed to and executed by the GPU 1115. The GPU 1115 can offload various computations or complement the image processing provided by the processing unit(s) 1110.

The read-only-memory (ROM) 1130 stores static data and instructions that are used by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the present disclosure use a mass-storage device (such as a magnetic or optical disk and its corresponding disk drive) as the permanent storage device 1135.

Other embodiments use a removable storage device (such as a floppy disk, flash memory device, etc., and its corresponding disk drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor uses at runtime. In some embodiments, processes in accordance with the present disclosure are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alpha-numeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 7 and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims. In some embodiments, an encoder may signal (or generate) one or more syntax element in a bitstream, such that a decoder may parse said one or more syntax element from the bitstream.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method comprising:
   receiving data from a bitstream for a block of pixels to be decoded as a current block of a current picture of a video;
   parsing whether to use adaptive parameter set (APS) for filtering the current block without determining whether to select a particular APS from a plurality of APSs;
   when the APS is used to filter the current block, parsing a first filter selection index for selecting a filter from a set of filters in the APS;
   when the APS is not used to filter the current block, parsing a second filter selection index for selecting a filter from a set of default fixed filters;
   filtering the current block based on the selected filter; and
   outputting the filtered current block.

2. The method of claim 1, wherein the APS comprises information for deriving filter coefficients and clipping values for adaptive loop filters (ALF).

3. The method of claim 1, wherein the current block is a coding tree block (CTB).

4. The method of claim 3, wherein the APS comprises a plurality of sets of filters applicable to luma and chroma CTBs.

5. The method of claim 1, wherein the APS is selected from a plurality of APSs by using an APS identifier signaled in a slice header.

6. The method of claim 5, wherein the selected APS is for providing a filter for chroma pixels of the current block.

7. The method of claim 5, wherein the APS identifier identifies temporal filters used in a current slice or tile group that encompass the current block.

8. The method of claim 1, wherein parameters for filters of chroma component are included in an APS for luma component.

9. The method of claim 1, wherein a flag indicating whether to use APS for filtering the current block is inferred to be true or false based on chroma format, chroma indicator, or slice type.

10. A video encoding method comprising:
    receiving raw pixel data for a block of pixels to be encoded as a current block of a current picture of a video into a bitstream;
    signaling whether to use adaptive parameter set (APS) for filtering the current block without determining whether to select a particular APS from a plurality of APSs for filtering the current block;
    when the APS is used to filter the current block, signaling a first filter selection index for selecting a filter from a set of filters in the APS;
    when the APS is not used to filter the current block, signaling a second filter selection index for selecting a filter from a set of default fixed filters; and
    encoding the current block by applying the selected filter.

11. An electronic apparatus comprising:
    a video decoder circuit configured to perform operations comprising:
      receiving data from a bitstream for a block of pixels to be decoded as a current block of a current picture of a video;
      parsing whether to use adaptive parameter set (APS) for filtering the current block without determining whether to select a particular APS from a plurality of APSs;
      when the APS is used to filter the current block, parsing a first filter selection index for selecting a filter from a set of filters in the APS;
      when the APS is not used to filter the current block, parsing a second filter selection index for selecting a filter from a set of default fixed filters
      filtering the current block based on the selected filter; and
      outputting the filtered current block.

* * * * *